(12) United States Patent
Jat

(10) Patent No.: US 11,153,765 B1
(45) Date of Patent: Oct. 19, 2021

(54) CAPACITY PLANNING OF TELECOMMUNICATIONS NETWORK BY DETECTING ANOMALIES IN SITE BEHAVIOR

(71) Applicant: T-Mobile USA, Inc., Bellevue, WA (US)

(72) Inventor: Khrum Kashan Jat, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/875,522

(22) Filed: May 15, 2020

(51) Int. Cl.
| H04W 16/18 | (2009.01) |
| H04L 12/24 | (2006.01) |
| H04W 24/02 | (2009.01) |
| H04W 24/08 | (2009.01) |

(52) U.S. Cl.
CPC ......... *H04W 16/18* (2013.01); *H04L 41/5038* (2013.01); *H04W 24/02* (2013.01); *H04W 24/08* (2013.01)

(58) Field of Classification Search
CPC ..... H04W 16/18; H04W 24/08; H04W 24/02; H04L 41/5038
See application file for complete search history.

(56) References Cited

U.S. PATENT DOCUMENTS

| 6,262,980 B1 | 7/2001 | Leung et al. |
| 6,526,010 B1 | 2/2003 | Morioka et al. |
| 6,891,694 B2 | 5/2005 | Hetzler et al. |

(Continued)

FOREIGN PATENT DOCUMENTS

| KR | 20120089467 A | 8/2012 |
| KR | 20150021561 A | 3/2015 |
| KR | 20170076700 A | 7/2017 |

OTHER PUBLICATIONS

Ahas, R. et al. "Mobile Positioning in Space-Time Behaviour Studies: Social Positioning Method Experiments in Estonia" Cartography and Geographic Information Science vol. 34, No. 4, 2007, p. 259-273.

(Continued)

*Primary Examiner* — Hassan Kizou
*Assistant Examiner* — Abdullahi Ahmed
(74) *Attorney, Agent, or Firm* — Perkins Coie LLP

(57) ABSTRACT

Systems and methods to detect abnormal behavior of cell sites and/or customers are disclosed. By detecting cell site and/or customer behavior anomalies, the system enhances capacity planning by helping understand congestion, more efficiently planning event sites, suggesting installation of temporary solutions, identifying when true traffic needs are increased, and detecting abnormal customer behavior and/or demand. The system accesses historical data for a set of KPIs (e.g., 3 months of hourly data that captures traffic, users, Physical Resource Block (PRB), and throughput). The system computes, for periodic time intervals (e.g., for each hour and each day), upper and lower limits for each site and for each KPI. Using this information, the system detects anomalies for current KPI measurements. The system sends alerts when anomalies are detected for a threshold period of time (e.g., when the KPI measurement falls outside of the computed upper and/or lower bounds continuously for 2-3 hours).

20 Claims, 7 Drawing Sheets

(56) References Cited

U.S. PATENT DOCUMENTS

| | | |
|---|---|---|
| 6,973,312 B1 | 12/2005 | Ngan et al. |
| 7,038,993 B2 | 5/2006 | Minamino et al. |
| 7,142,874 B1 | 11/2006 | Oleniczak |
| 7,343,375 B1 | 3/2008 | Dulac |
| 7,539,111 B2 | 5/2009 | Ishida et al. |
| 7,539,919 B2 | 5/2009 | Hwang et al. |
| 7,680,495 B2 | 3/2010 | Abed et al. |
| 7,710,841 B2 | 5/2010 | Hwang et al. |
| 7,739,578 B2 | 6/2010 | Hwang et al. |
| 7,813,952 B2 | 10/2010 | Eskandari |
| 7,823,042 B2 | 10/2010 | Hwang et al. |
| 7,849,027 B2 | 12/2010 | Koran et al. |
| 7,898,921 B2 | 3/2011 | Ishida et al. |
| 7,929,459 B2 | 4/2011 | Silva et al. |
| 7,941,148 B2 | 5/2011 | Roskowski et al. |
| 7,945,837 B2 | 5/2011 | Hwang et al. |
| 7,957,993 B2 | 6/2011 | Macgregor |
| 7,966,233 B1 | 6/2011 | Khowash et al. |
| 7,987,122 B2 | 7/2011 | Bevente et al. |
| 8,060,079 B1 | 11/2011 | Goyal et al. |
| 8,060,602 B2 | 11/2011 | Singh et al. |
| 8,073,119 B2 | 12/2011 | Bevente et al. |
| 8,199,901 B2 | 6/2012 | Rani et al. |
| 8,270,979 B1 | 9/2012 | Vargantwar |
| 8,332,256 B2 | 12/2012 | Dey et al. |
| 8,429,270 B2 | 4/2013 | Singh et al. |
| 8,522,108 B2 | 8/2013 | Hwang et al. |
| 8,526,320 B2 | 9/2013 | Puthenpura et al. |
| 8,538,379 B1 | 9/2013 | Jessen et al. |
| 8,572,464 B2 | 10/2013 | Hwang et al. |
| 8,665,835 B2 | 3/2014 | Hussein et al. |
| 8,676,799 B1 | 3/2014 | Vaver |
| 8,694,018 B2 | 4/2014 | Budic et al. |
| 8,782,045 B1 | 7/2014 | Vaver |
| 8,782,216 B2 | 7/2014 | Raghavendran et al. |
| 8,861,691 B1 | 10/2014 | De et al. |
| 8,891,746 B2 | 11/2014 | Stachiw et al. |
| 8,914,372 B2 | 12/2014 | Cao et al. |
| 8,918,108 B2 | 12/2014 | Arad et al. |
| 8,918,397 B2 | 12/2014 | Cao et al. |
| 8,954,791 B2 | 2/2015 | Kataria et al. |
| 8,966,055 B2 | 2/2015 | Mittal et al. |
| 9,031,561 B2 | 5/2015 | Nuss et al. |
| 9,047,226 B2 | 6/2015 | Thomas et al. |
| 9,113,365 B2 | 8/2015 | Tang et al. |
| 9,154,550 B1 | 10/2015 | Abgrall et al. |
| 9,204,319 B2 | 12/2015 | Ouyang et al. |
| 9,226,178 B2 | 12/2015 | Tarraf et al. |
| 9,253,334 B1 | 2/2016 | Rai et al. |
| 9,264,932 B2 | 2/2016 | Chen et al. |
| 9,332,458 B2 | 5/2016 | Nuss et al. |
| 9,411,653 B2 | 8/2016 | Trammel et al. |
| 9,413,890 B2 | 8/2016 | Mccormack et al. |
| 9,424,121 B2 | 8/2016 | Kushnir et al. |
| 9,430,944 B2 | 8/2016 | Grimm et al. |
| 9,439,081 B1 | 9/2016 | Knebl et al. |
| 9,456,362 B2 | 9/2016 | Flanagan et al. |
| 9,479,981 B2 | 10/2016 | Dimou et al. |
| 9,491,285 B2 | 11/2016 | Vaderna et al. |
| 9,503,919 B2 | 11/2016 | Sofuoglu et al. |
| 9,563,491 B2 | 2/2017 | Scouller et al. |
| 9,628,363 B2 | 4/2017 | Singh et al. |
| 9,674,374 B1 | 6/2017 | Bolton et al. |
| 9,706,438 B1 | 7/2017 | Kadmon et al. |
| 9,712,295 B2 | 7/2017 | Park et al. |
| 9,753,477 B2 | 9/2017 | Berka et al. |
| 9,826,412 B2 | 11/2017 | Henderson et al. |
| 9,826,420 B2 | 11/2017 | Tarraf et al. |
| 9,867,080 B2 | 1/2018 | Sung et al. |
| 9,892,026 B2 | 2/2018 | Isman et al. |
| 9,894,215 B1 | 2/2018 | Bolton et al. |
| 9,924,045 B1 | 3/2018 | Guha et al. |
| 10,039,013 B2 | 7/2018 | Periyasamy et al. |
| 10,044,878 B2 | 8/2018 | Guha et al. |
| 10,050,844 B2 | 8/2018 | Flanagan et al. |
| 10,079,735 B2 | 9/2018 | Martone et al. |
| 10,091,679 B1 | 10/2018 | Munar et al. |
| 10,231,147 B2 | 3/2019 | Sung et al. |
| 10,555,191 B1 | 2/2020 | Jat et al. |
| 2003/0171976 A1 | 9/2003 | Fames et al. |
| 2006/0064346 A1 | 3/2006 | Steenstra et al. |
| 2006/0167777 A1 | 7/2006 | Shkedy |
| 2007/0156673 A1 | 7/2007 | Maga et al. |
| 2010/0041408 A1 | 2/2010 | Caire et al. |
| 2012/0190380 A1 | 7/2012 | Dupray et al. |
| 2012/0244898 A1 | 9/2012 | Guey et al. |
| 2013/0095872 A1 | 4/2013 | Sediq et al. |
| 2013/0229914 A1 | 9/2013 | Suerbaum |
| 2014/0278035 A1 | 9/2014 | Nortrup |
| 2016/0381580 A1* | 12/2016 | Kwan ................. H04L 41/5009 370/252 |
| 2017/0243484 A1 | 8/2017 | Li et al. |
| 2017/0272319 A1 | 9/2017 | Sheen et al. |
| 2018/0006957 A1 | 1/2018 | Ouyang et al. |
| 2019/0141580 A1* | 5/2019 | Oktay ................... H04W 72/08 |
| 2019/0159048 A1* | 5/2019 | Feldkamp ............... H04L 43/08 |
| 2019/0208438 A1* | 7/2019 | Yang ....................... H04L 43/16 |
| 2019/0239238 A1* | 8/2019 | Calabrese ............. H04W 24/08 |
| 2020/0076520 A1 | 3/2020 | Jana et al. |
| 2020/0314683 A1* | 10/2020 | Imran ................... H04W 76/15 |
| 2021/0014698 A1* | 1/2021 | Meier-Hellstern .... H04W 16/22 |
| 2021/0037399 A1 | 2/2021 | Jat et al. |
| 2021/0049656 A1 | 2/2021 | Jat et al. |

OTHER PUBLICATIONS

Bi, Suzhi et al. "Engineering Radio Maps for Wireless Resource Management" IEEE Wireless Communications, Apr. 2019, p. 133-141.

De Reuver, M. et al. "Designing viable business models for context-aware mobile services" Elsevier Telematics and Informatics 26 (2009) p. 240-248.

Lee, Seung-Cheol et al. "Efficient Mining of User Behaviors by Temporal Mobile Access Patterns" International Journal Computer Science and Network Security, vol. 7, No. 2, Feb. 2007, p. 285-291.

Ratti, C. et al. "Mobile Landscapes: using location data from cell phones for urban analysis" Environment and Planning B: Planning and Design 2006, vol. 33, p. 727-748.

Roth, John D. et al. "Efficient System Geolocation Architecture in Next-Generation Cellular Networks" IEEE Systems Journal, vol. 12, No. 4, Dec. 2018, p. 3414-3425.

Tseng, V. S. et al. "Mining Temporal Mobile Sequential Patterns in Location-Based Service Environments" IEEE International Conference 2007, 8 pages.

U.S. Appl. No. 16/855,991, filed Apr. 22, 2020; titled Identification and Prioritization of Optimum Capacity Solutions in a Telecommunications Network.

U.S. Appl. No. 16/730,594, filed Dec. 30, 2019; titled Optimum Network Performance Improvement Solutions Selection Systems and Methods.

U.S. Appl. No. 16/529,702, filed Aug. 1, 2019 (U.S. Pat. No. 10,555,191); titled Optimum Network Performance Improvement Solutions Selection Systems and Methods.

* cited by examiner

| DATE_ID | HOUR_ID | cell | Traffic_MB | RRC_Users | CQI | UE_Throughputs_Kbps | PRB Utilizations | Delay_ms | Spectral Efficiency |
|---|---|---|---|---|---|---|---|---|---|
| XXXXXXXX | 15 | B1AT1xxxxx | 4701.1 | 28.5 | 7.8 | 5229.5 | 88.2 | 3.1 | 1.0 |
| XXXXXXXX | 16 | B1AT1xxxxx | 5199.9 | 29.1 | 7.8 | 5016.7 | 90.5 | 3.1 | 1.1 |
| XXXXXXXX | 17 | B1AT1xxxxx | 4553.2 | 30.3 | 8.0 | 6520.9 | 82.0 | 3.1 | 1.1 |
| XXXXXXXX | 18 | B1AT1xxxxx | 5119.5 | 31.6 | 7.5 | 3787.3 | 93.2 | 3.1 | 1.0 |
| XXXXXXXX | 19 | B1AT1xxxxx | 6294.7 | 31.0 | 7.8 | 4483.7 | 92.8 | 3.1 | 1.1 |
| XXXXXXXX | 20 | B1AT1xxxxx | 6776.4 | 32.2 | 7.8 | 4157.8 | 93.2 | 3.0 | 1.1 |
| XXXXXXXX | 21 | B1AT1xxxxx | 5990.0 | 35.8 | 7.6 | 4185.5 | 94.0 | 3.0 | 1.0 |
| XXXXXXXX | 22 | B1AT1xxxxx | 5176.1 | 29.9 | 7.8 | 5050.4 | 87.3 | 3.1 | 1.1 |
| XXXXXXXX | 23 | B1AT1xxxxx | 5682.5 | 28.7 | 8.1 | 6145.9 | 86.2 | 3.0 | 1.1 |

*FIG. 3A*

| Hour ID | Percentile (5) of Traffic_GB | | | | | | | Percentile (95) of Traffic_GB | | | | | | |
|---|---|---|---|---|---|---|---|---|---|---|---|---|---|---|
| | Sun | Mon | Tue | Wed | Thu | Fri | Sat | Sun | Mon | Tue | Wed | Thu | Fri | Sat |
| 0 | 4.4 | 4.7 | 4.5 | 4.7 | 4.6 | 4.7 | 4.9 | 7.0 | 6.0 | 5.8 | 6.5 | 6.4 | 6.6 | 6.1 |
| 1 | 4.5 | 3.8 | 2.7 | 3.8 | 3.5 | 3.9 | 4.0 | 5.8 | 4.9 | 5.0 | 5.4 | 5.2 | 5.6 | 5.6 |
| 2 | 3.5 | 2.6 | 2.7 | 2.1 | 2.8 | 3.3 | 2.8 | 4.4 | 4.0 | 4.9 | 4.6 | 5.2 | 5.2 | 4.8 |
| 3 | 2.8 | 2.2 | 2.3 | 2.2 | 2.1 | 2.3 | 2.2 | 4.5 | 4.0 | 3.7 | 3.8 | 3.4 | 3.6 | 3.8 |
| 4 | 2.0 | 1.7 | 1.6 | 2.1 | 1.9 | 1.6 | 1.5 | 3.7 | 3.7 | 3.4 | 3.2 | 2.9 | 3.5 | 3.2 |
| 5 | 1.6 | 1.1 | 1.3 | 1.2 | 1.6 | 1.5 | 1.3 | 2.9 | 2.2 | 3.0 | 2.5 | 2.7 | 2.5 | 2.8 |
| 6 | 1.3 | 1.3 | 1.2 | 1.2 | 1.4 | 1.6 | 1.2 | 2.5 | 2.5 | 2.8 | 2.7 | 2.5 | 2.8 | 2.7 |
| 7 | 1.8 | 1.7 | 1.9 | 1.7 | 2.3 | 2.1 | 1.8 | 2.8 | 4.0 | 3.6 | 3.3 | 4.2 | 3.5 | 3.2 |
| 8 | 2.4 | 2.1 | 2.4 | 2.3 | 2.7 | 2.5 | 2.5 | 4.0 | 4.3 | 4.0 | 4.1 | 4.0 | 4.1 | 4.4 |
| 9 | 3.0 | 3.1 | 3.0 | 3.1 | 3.3 | 3.0 | 2.6 | 4.8 | 4.7 | 4.7 | 5.1 | 4.7 | 4.7 | 4.6 |
| 10 | 3.5 | 3.5 | 3.2 | 3.2 | 3.6 | 3.3 | 3.9 | 5.4 | 4.9 | 4.8 | 4.5 | 5.4 | 5.4 | 4.7 |
| 11 | 4.1 | 3.8 | 3.4 | 3.6 | 3.5 | 3.8 | 3.9 | 5.5 | 6.5 | 6.0 | 4.6 | 4.7 | 4.6 | 5.7 |
| 12 | 4.4 | 3.8 | 3.8 | 3.6 | 4.0 | 4.1 | 3.9 | 5.1 | 5.8 | 5.3 | 5.4 | 4.9 | 5.1 | 5.9 |
| 13 | 4.0 | 3.9 | 4.0 | 3.6 | 3.7 | 3.8 | 3.9 | 6.2 | 5.6 | 5.4 | 6.0 | 5.2 | 5.4 | 6.1 |
| 14 | 4.0 | 3.3 | 4.1 | 3.8 | 3.7 | 3.7 | 4.1 | 6.3 | 5.8 | 4.9 | 5.2 | 5.7 | 4.8 | 6.2 |
| 15 | 4.2 | 3.9 | 4.0 | 4.0 | 4.1 | 4.2 | 4.0 | 5.5 | 5.7 | 5.5 | 5.0 | 5.3 | 5.6 | 5.6 |
| 16 | 4.1 | 3.5 | 4.2 | 4.1 | 3.7 | 4.1 | 4.1 | 5.7 | 6.0 | 6.1 | 5.3 | 5.7 | 5.4 | 6.4 |
| 17 | 4.4 | 4.0 | 4.1 | 3.7 | 4.2 | 3.8 | 4.0 | 5.6 | 5.9 | 6.9 | 5.4 | 5.7 | 5.9 | 6.4 |
| 18 | 4.3 | 4.1 | 3.9 | 4.2 | 3.9 | 4.3 | 4.2 | 5.9 | 5.9 | 5.9 | 6.2 | 6.2 | 5.7 | 6.1 |
| 19 | 3.9 | 4.3 | 3.9 | 3.9 | 4.0 | 4.4 | 4.0 | 6.0 | 5.7 | 5.7 | 6.5 | 5.9 | 6.2 | 6.1 |
| 20 | 4.0 | 4.4 | 4.8 | 4.4 | 4.2 | 4.6 | 4.1 | 5.6 | 6.0 | 6.4 | 6.5 | 6.7 | 6.9 | 5.9 |
| 21 | 4.3 | 4.6 | 4.5 | 4.5 | 4.4 | 4.2 | 4.6 | 6.2 | 6.9 | 6.9 | 6.6 | 7.2 | 6.3 | 6.6 |
| 22 | 4.5 | 4.7 | 5.3 | 4.6 | 5.2 | 4.6 | 4.7 | 6.4 | 6.3 | 7.2 | 6.8 | 6.5 | 6.7 | 6.8 |
| 23 | 4.9 | 5.3 | 5.2 | 5.2 | 5.3 | 4.9 | 4.8 | 5.9 | 7.4 | 6.3 | 7.3 | 6.6 | 6.7 | 6.8 |

Site #A Limit created based on 6 months of data.

(1) Network Data 3 Months (Traffic GB)

(2) Threshold (Every Hour and Day) 95th Perc / 5th Perc (3) Anomaly if GB hit >50% of thresholds Upper Limit 50% >95th Perc / Lower Limit 50% >5th Perc (4) 2 Consecutive Hours : Anomaly : Y/N (5) Anomaly (Y) : Send Alert

FIG. 3B

CAPACITY PLANNING OF TELECOMMUNICATIONS NETWORK BY DETECTING ANOMALIES IN SITE BEHAVIOR

CROSS-REFERENCE TO RELATED APPLICATIONS

This application incorporates by reference U.S. application Ser. No. 16/855,991, filed Apr. 22, 2020, entitled IDENTIFICATION AND PRIORITIZATION OF OPTIMUM CAPACITY SOLUTIONS IN A TELECOMMUNICATIONS NETWORK.

BACKGROUND

A telecommunications network is established via a complex arrangement and configuration of many cell sites that are deployed across a geographical area. For example, there can be different types of cell sites (e.g., macro cells, microcells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

As device usage continues to rise at an impressive rate, there are too many people using too many network (and/or data)-hungry applications in places where the wireless edge of the telecommunications network has limited or no capacity. As a result, most telecommunications networks have to contend with issues of network congestion. Network congestion is the reduced quality of service that occurs when a network node carries more data than it can handle. Typical effects include queueing delay, packet loss or the blocking of new connections, overall resulting in degraded customer experience.

When performance of a cell site in a telecommunications network degrades below a threshold value (for example, an LTE site gets congested), different solutions have been suggested to address and resolve the degradation issues. However, it is difficult for wireless telecommunication service providers to efficiently and effectively understand congestion, identify whether true traffic needs have increased (leading to congestion), and/or detect abnormal customer behavior and demand.

BRIEF DESCRIPTION OF THE DRAWINGS

FIG. 3A is an example of data generated/accessed/received/collected by the site behavior data module.

FIG. 3B is an example of a table of data for use in computing thresholds or limits.

Figure 1:
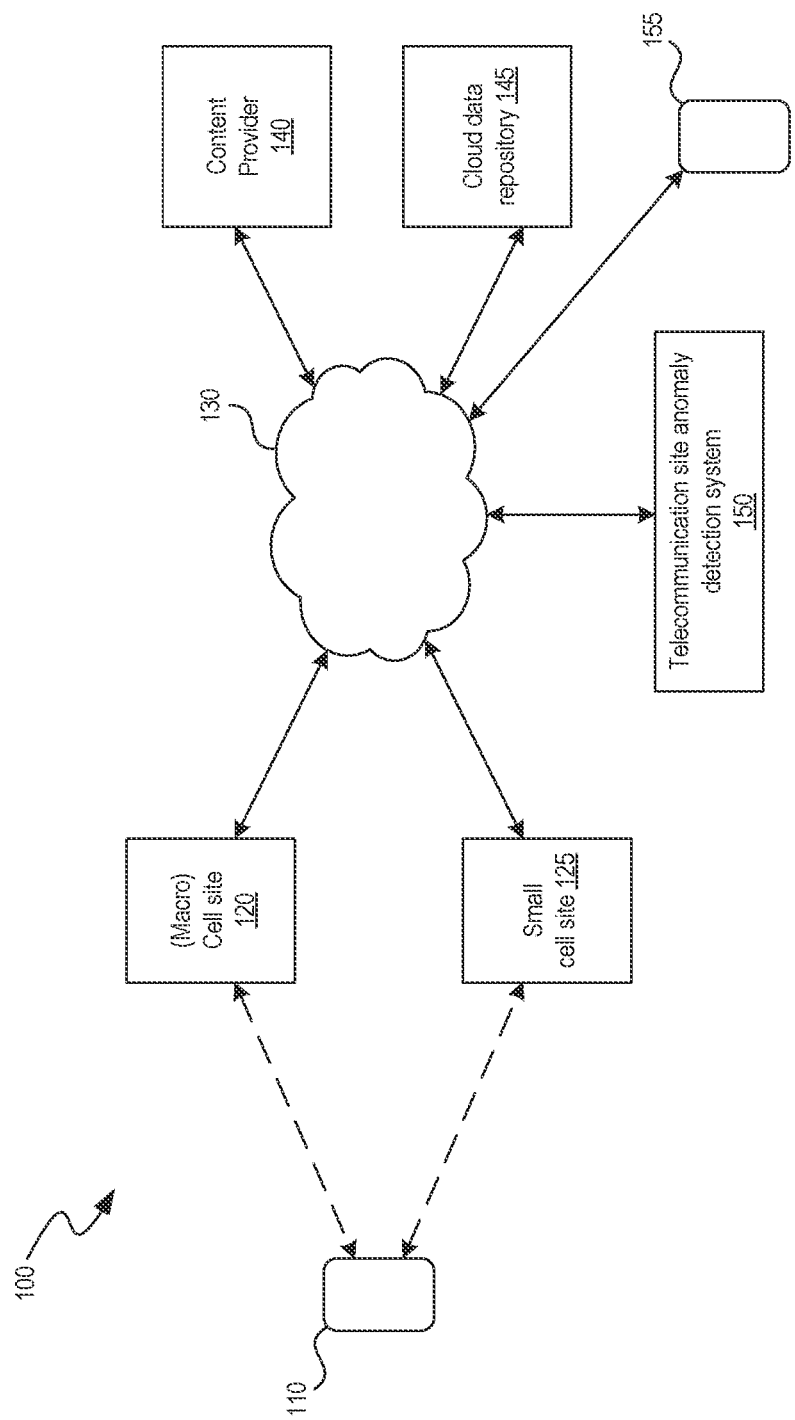
FIG. 1 is a block diagram illustrating a suitable computing environment within which to detect anomalies in site behavior within a telecommunications network.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

An aim of a telecommunications service provider is to minimize customer experience degradation. This is typically achieved by deploying congestion management and/or network improvement solutions at one or more cell sites. To combat network congestion, different capacity planning solutions have been suggested to address and resolve the degradation issues. However, it is difficult for wireless telecommunication service providers to efficiently and effectively understand (and/or predict) congestion, identify whether true traffic needs have increased (leading to congestion), and/or detect abnormal customer behavior and demand. Further, since a wide variety of capacity planning solutions are available as options to resolve degradation issues, it is difficult to determine which solutions, if any, are the best candidates to deploy at particular locations.

As a result, the process for understanding congestion, planning for capacity management at sites, and identifying which capacity planning solutions to deploy to alleviate network congestion and/or improve capacity is more of a trial and error process. This results in inefficiencies as well as wasted costs as telecommunications service providers try (and fail) deploying sub-optimum capacity planning solutions that are not tailored to the particular location of network traffic usage and congestion.

To solve the above and other problems, the inventors have developed an anomaly detection system and method to understand abnormal behavior of cell sites ("telecommunication site anomaly detection system"). By efficiently and optimally detecting such cell site anomalies, the system enhances capacity planning by helping understand congestion, more efficiently planning event sites, suggesting installation of temporary solutions (e.g., cell on wheels), identifying when true traffic needs are increased, and detecting abnormal customer behavior and/or demand. The telecommunication site anomaly detection system does this by measuring/monitoring site behavior data (e.g., historical data), learning from this data by determining lower and upper limits for various behavior metrics (e.g., key performance indicators), monitoring current site behavior, applying the lower and upper limits to detect site behavior anomalies, and sending alerts when site anomalies are detected.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram illustrating a suitable computing environment 100 within which to detect abnormal telecommunication site and/or customer behavior within a telecommunications network.

One or more user devices 110, such as mobile devices or user equipment (UE) associated with users (such as mobile phones (e.g., smartphones), tablet computers, laptops, and so on), Internet of Things (IoT) devices, devices with sensors, and so on, receive and transmit data, stream content, and/or perform other communications or receive services over a telecommunications network 130, which is accessed by the user device 110 over one or more cell sites 120, 125. For example, the user device 110 can access a telecommunication network 130 via a cell site at a geographical location that includes the cell site, in order to transmit and receive data (e.g., stream or upload multimedia content) from various entities, such as a content provider 140, cloud data repository 145, and/or other user devices 155 on the network 130 and via the cell site 120.

The cell sites may include macro cell sites 120, such as base stations, small cell sites 125, such as picocells, microcells, or femtocells, and/or other network access component or sites (including IEEE 802.11 WLAN access points). The cell cites 120, 125 can store data associated with their operations, including data associated with the number and types of connected users, data associated with the provision and/or utilization of a spectrum, radio band, frequency channel, and so on, provided by the cell sites 120, 125, and so on. The cell sites 120, 125 can monitor their use, such as the provisioning or utilization of PRBs provided by a cell site physical layer in LTE network. For example, a cell site 120 having a channel bandwidth of 5 MHz that provides 25 available physical resource blocks through which data can be transmitted to/from the user device 110.

Other components provided by the telecommunications network 130 can monitor and/or measure the operations and transmission characteristics of the cell sites 120, 125 and other network access components. For example, the telecommunications network 130 can provide a network monitoring system, via a network resource controller (NRC) or network performance and monitoring controller, or other network control component, in order to measure and/or obtain the data associated with the utilization of cell sites 120, 125 when data is transmitted within a telecommunications network.

The computing environment 100 includes a telecommunication site anomaly detection system 150 configured to monitor aspects of the network 130 based on, for example, data received from the network monitoring system. The telecommunication site anomaly detection system 150 can monitor and detect site behavior anomalies as described in detail below.

FIG. 1 and the discussion herein provide a brief, general description of a suitable computing environment 100 in which the telecommunication site anomaly detection system 150 can be supported and implemented. Although not required, aspects of the telecommunication site anomaly detection system 150 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through any communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative implementation, the mobile device or portable device can represent the server portion, while the server can represent the client portion.

In some implementations, the user device 110 and/or the cell sites 120, 125 can include network communication components that enable the devices to communicate with remote servers or other portable electronic devices by transmitting and receiving wireless signals using a licensed, semi-licensed, or unlicensed spectrum over communications network, such as network 130. In some cases, the communication network 130 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the telecommunication site anomaly detection system 150 will now be described.

Examples of Detecting Telecommunication Site and/or Customer Behavior Anomalies

Figure 2:
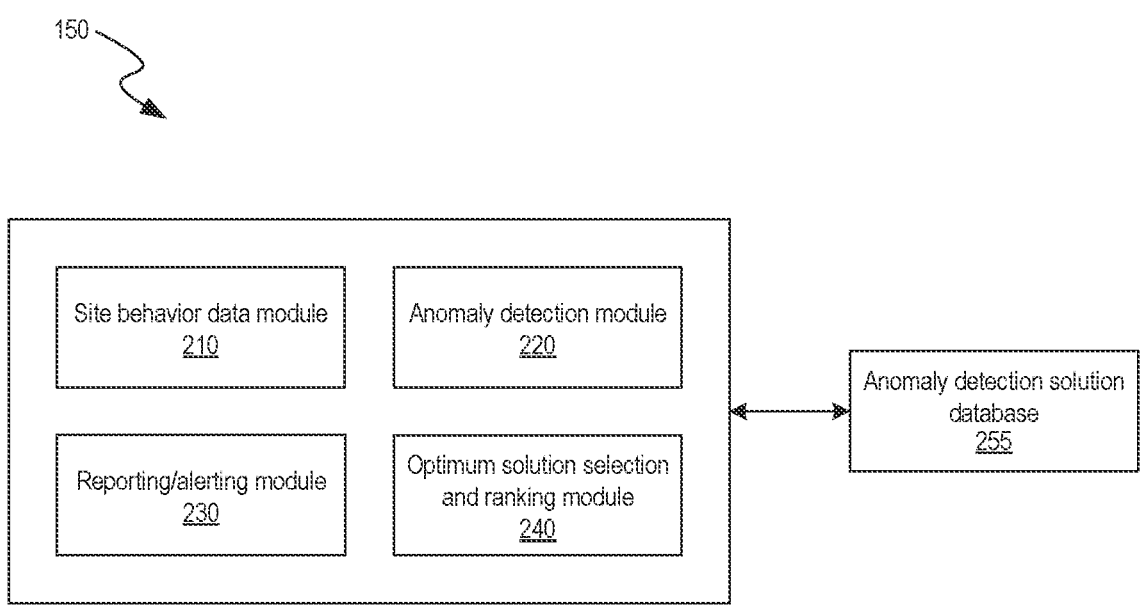
FIG. 2 is a block diagram illustrating the components of the telecommunication site anomaly detection system.

FIG. 2 is a block diagram illustrating the components of the telecommunication site anomaly detection system 150. The telecommunication site anomaly detection system 150 can include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the specific functions described herein. For example, the telecommunication site anomaly detection system 150 can include a site behavior data module 210, an anomaly detection module 220, a reporting/alerting module 230, and an optimum solution selection module 240, each of which is discussed separately below.

Site Behavior Data Module

The site (and/or customer) behavior data module 210 is configured and/or programmed to generate/access/receive/collect a set of network traffic data records comprising information about cell site locations and historical values of performance indicators. The site behavior data module 210 collects/receives/accesses one or more of the following data records associated with the performance indicators (which can be stored in the anomaly detection solutions database 255): location specific records (LSR), call data records (CDRs), timing advance values, RF signal data, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of usage records (for example, telecommunications service provider, third-party, application owner, etc.). Examples of other types of data collected by the site behavior data module 210 include, but are not limited to, data collected from third party applications (e.g., including crowdsourced data) that can help to determine customer experience with location. For example, the site behavior data module 210 can collect information of a user's location using his/her social media posts (e.g., tweets, check-ins, posts, etc.). As another example, the site behavior data module 210 collects application level data (e.g., collected using applications related to Internet of Things (IoT) devices, sensors, billing meters, traffic lights, etc.) to identify the user location and/or data related to the performance indicators.

The set of performance indicators (PIs) comprises hundreds (for example 200-300) of performance indicators, each of which can be used to measure an aspect of performance of a specific cell site. For example, the set of PIs can include some or all of the following performance indicators: traffic, number of users, PRB utilization, CQI, throughput, carrier aggregation, advanced Quadrature Amplitude Modulation (QAM), network performance improvement solution deployed at site, cost of deploying a network performance improvement solution, cost of maintaining the network performance improvement solution, expected lifetime of the network performance improvement solution, duration of deploying the network performance improvement solution, lifetime of the network performance improvement solution, efficacy of the network performance improvement solution, location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rent cost associated with the network performance improvement solution, backhaul availability, and so on. FIG. 3A is an example of data generated/accessed/received/collected by the site behavior data module 210.

Anomaly Detection Module

The anomaly detection module 220 is configured and/or programmed to understand abnormal behavior of sites and/or abnormal customer behavior. In some implementations, the anomaly detection module 220 first selects a subset of key performance indicators (KPIs) from the set of performance indicators. The anomaly detection module 220 selects the subset of key performance indicators based on one or more of the following factors: correlation of each key performance indicator with customer experience, correlation of each key performance indicator with other key performance indicators, user (for example, administrator) preference, telecommunications service provider preference, and so on. For instance, the anomaly detection module 220 selects performance indicators which exhibit a low degree of correlation yet reflect the dimensions of the overall composite. For example, the KPIs selection module 210 selects the following key performance indicators as components of the subset of key performance indicators: traffic, number of users, PRB utilization, CQI, and throughput. Alternatively or additionally, the anomaly detection module 220 selects a top threshold number of performance indicators having a maximum correlation with the customer experience. In some implementations, the anomaly detection module 220 selects components of the subset of key performance indicators based on principal component analysis.

After selecting the subset of KPIs, the anomaly detection module 220 accesses the network traffic data records (collected by the site behavior data module 210) spanning a particular period of time and at a particular frequency intervals (e.g., data records collected over 2-3 months for each hour from each site). An example table that shows data records used for anomaly detection is shown in FIG. 3B, which shows hourly data from one site example for a month time period. The time period span and/or the frequency intervals can be based on one or more factors, such as volume of data available, location of site, network performance improvement solution(s) deployed, demographic information associated with site, and so on. The time period span can change as the module improves over the period of time, e.g., the module time period can be 3 months initially to create the threshold for each KPI and each cell site, but the module can continue to learn the traffic pattern for specific hours and days of week and later learn specific months and days of the year as well.

The anomaly detection module 220 then uses the accessed historical network traffic records to compute/generate a set of upper limit values and a set of lower limit values of the selected KPIs. For instance, after selecting KPIs traffic, users, PRB, and throughput, and accessing the relevant network traffic data records, the anomaly detection module 220 determines, for each timing granularity (e.g., each hour and each day separately), a set of upper limits values (e.g., based on an upper limit threshold, such as 95th percentile) and a set of lower limit values (e.g., based on a lower limit threshold, such as 5th percentile) for each site and for each KPI. FIG. 3B shows an example table of data records, showing how the upper and lower limits are computed for one site for one KPI. For example, the anomaly detection module 220 computes a set of upper limit values for a KPI as the 90th percentile of 3 months of data for specific hour and specific day for each site, and a set of lower limit values for the KPI as the 5th percentile of 3 months of data for the specific hour and specific data for the site. In some implementations, the anomaly detection module 220 computes the upper and/or lower limit values for each hour and/or each date. Alternatively or additionally, the anomaly detection module 220 computes the upper and/or lower limit values for a selected set of hours and/or dates based on, for example, the volume of available data records, range of values, user-specific preferences, desired accuracy level, peak congestion points, and so on. Other factors can include the selection of KPIs, users can set the system to run anomaly detection on only one KPI (or more) at a given time, such as PRB/user/traffic/throughput/CQI/MCS/latency/jitter reported.

Figure 4A:
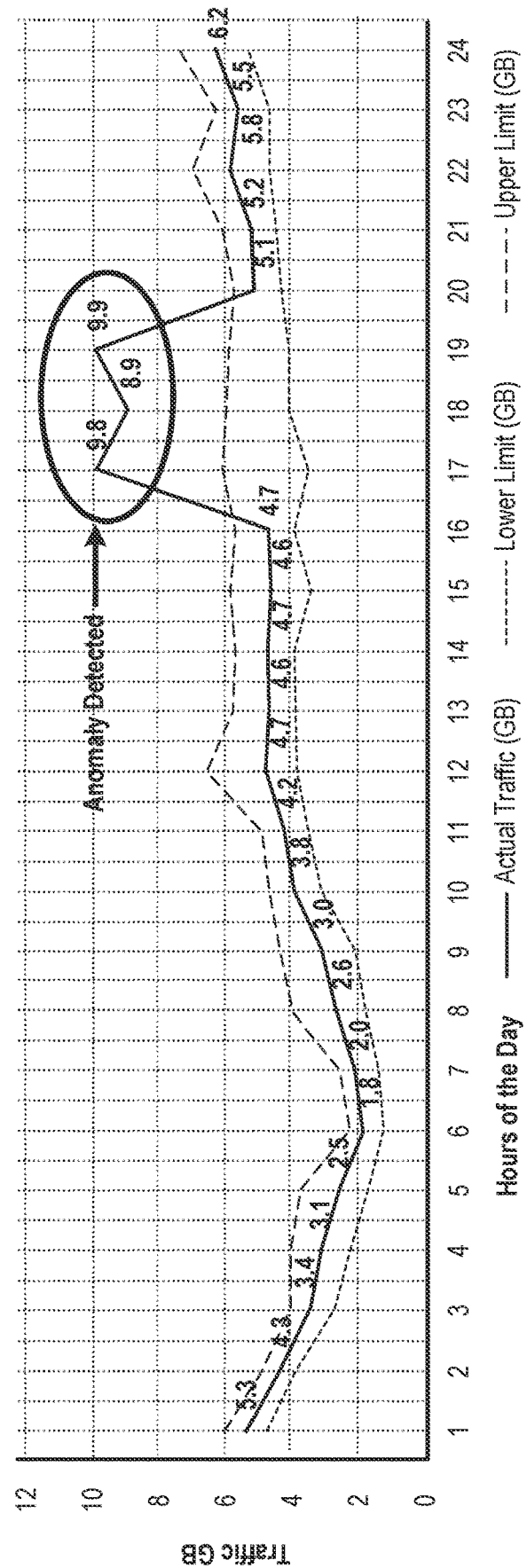
FIG. 4A is a chart illustrating the upper and lower limits of a KPI (traffic) determined at an hourly frequency.

FIG. 4A is a chart illustrating the upper and lower limits of a KPI (traffic) determined at an hourly frequency. In some implementations, the set of upper limit values and/or the set of lower limit values is updated periodically (e.g., at specific time intervals), or in real-time as new records are received/accessed by the site behavior data module 210.

Based on the determined set of upper limit values and/or the set of lower limit values (or a threshold thereof), the anomaly detection module 220 periodically detects for anomalies in site and/or customer behavior. For example, the anomaly detection module 220 detects, at hourly intervals, whether the KPI measurements of current (e.g., near real-time) network traffic data records are within their respective upper and lower limits value ranges for each site (and/or each customer). The examples noted herein allow the present system to detect differing types of abnormal site behavior and abnormal customer behavior. The system can detect the network anomalies, which can indicate critical incidents, such as a technical glitch, or potential opportunities, for instance a change in consumer behavior. For example, a network operator can understand excessive demand on a site is normal/abnormal and should not increase capex spending if its abnormal. In another example, the system can allow the operator to learn and plan for event and venue sites, such as sites the go into abnormal behavior every Friday night (traffic increased 50% to upper limit), thus triggering a need to find a solution to improve the customer experience at those sites. In yet another example, if sites go for 50% lower of their lower 5th percentile limit for a certain duration, the system can help the operator understand that demand has been reduced in that area and further analysis of the area required. The operator may, after finding additional insights (e.g. traffic has been taken by newer nearby sites), the operator can reduce the configured users and licenses of the site, which saves in licensing cost (where the operator pays per user license fees to a vendor, if demand has been decreased for a long time and RCA determines that this relates to normal demand decreases, thus license cost per user is saved by reducing licenses installed on the site).

Alternatively and/or additionally, the anomaly detection module 220 uses supervised/unsupervised anomaly detection methods, such as time services based, rule based, support vector machines (e.g., one-class support vector machines), local outlier factor, etc. to detect anomalies in site and/or customer behavior. It is important for network operators to ensure network quality and reliability during the week days, weekends and festivals. The system described above uses rule based classification to compute upper and lower thresholds for each site for different hours and days, but other methods to understand and detect the anomalies through supervised or unsupervised anomalies detection techniques include the following:

Nearest Neighbor Based algorithms (k-NN, Local Outliner Factor (LOF)): these supervised learning algorithms store available examples and then classifies new ones based on similarities in distance metrics, where the most common distance measure is Euclidean distance. LOF compares local density of an item to local densities of its neighbors. Thus the system can determine areas of similar density and items that have a significantly lower density than their neighbors.

Support Vector Machine (SVM): classifies the anomalies of data based on hyperlane that separate data into 2 classes; hyperplane is a function such as a formula for a line (e.g. $y=nx+b$).

Time Based methods: used in anomaly detections using network historical data used to forecast expected values using ARIMA, ETS and later measured with actual data to detect anomalies as false positive, false negative, etc. This requires more significant resources for planning and forecasting for each network element for every hour, day, etc.

Reporting/Alerting Module

Figure 4B:
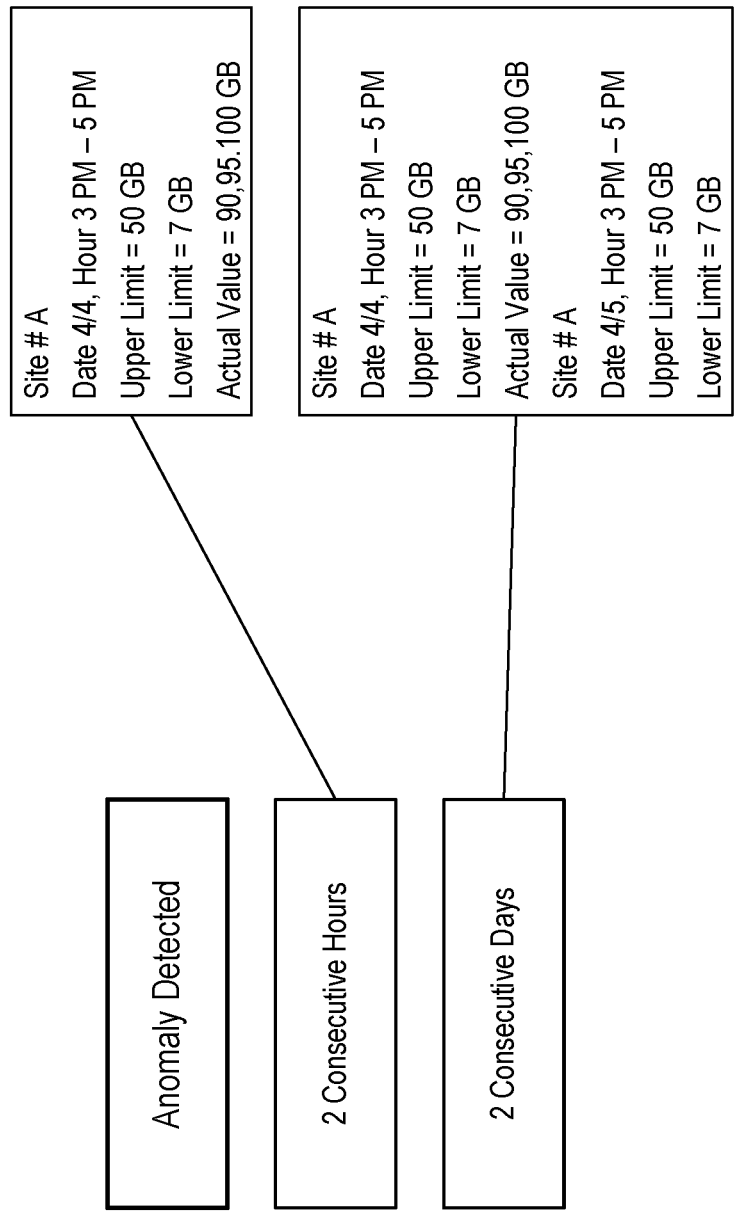
FIG. 4B is a diagram illustrating different thresholds for different time periods.

The reporting/alerting module 230 is configured and/or programmed to report abnormal site (or customer) behavior by, for example, sending alerts based on alert rules. FIG. 4B shows some examples of alert rules. Email alerts can be sent when values are outside a first threshold range, but call alerts are send when values are outside a second threshold range. For example, when the anomaly detection module 220 determines abnormal/anomalous site behavior (e.g., when the site's current network traffic records show that the values of selected KPIs are outside the upper and lower limit values for a period of time (e.g., 2-3 continuous hours)), the reporting/alerting module 230 generates reports/alerts regarding the detected abnormal behavior.

Optimum Solution Selection and Ranking Module

The optimum solution selection and ranking module 240 is configured and/or programmed to select and recommend one (or more) network performance improvement solutions to deploy at particular locations/sites where abnormal behavior was detected. Examples of network performance improvement solutions include, but are not limited to adding spectrum, removing spectrum, adding a proximate cell site, removing a proximate cell site, displacing a proximate cell site, adding or enhancing at least one technology capability, cell split, small cell deployment, sector addition, sector removal, sector capacity enhancement, cell on wheels addition, cell on wheel removal, tower addition, tower removal, hot spots addition, hot spots removal, capacity modification, and so on.

Upon receiving details of a site where abnormal behavior was detected, the optimum solution selection and ranking module 240 identifies a prioritized set of network performance improvement solutions capable of being deployed at the received location. The optimum solution selection and ranking module 240 identifies the prioritized set of network performance improvement solutions based on values of a set of prioritization parameters. The set of prioritization parameters comprises one or more of the following: gain index, gain measures, time to deploy solution, lead time to deploy solution, cost to deploy solution, cost to maintain solution, total cost of solution, expected lifetime of solution, average median income, user demographics (e.g., age, income, crime statistics, occupation, education level, ethnicity, and so on), duration of gain to customers, change in customers after deploying solution, change in revenue after deploying solution, change in sales after deploying solution, traffic, number of users, Physical Resource Block (PRB) utilization, Channel Quality Indicator (CQI), throughput, carrier aggregation, advanced Quadrature Amplitude Modulation (QAM), duration of deploying the network performance improvement solution, lifetime of the network performance improvement solution, efficacy of the network performance improvement solution, location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rent cost associated with the network performance improvement solution, backhaul availability, and so on. Alternatively or additionally, the optimum solution selection and ranking module 240 receives one or more prioritization parameters as output metrics that are to be optimized at the desired location, such as expected gain, length of solution to deploy, best solution, and so on.

Additionally or alternatively, the optimum solution selection and ranking module 240 computes a rank value for each network performance improvement solution in the prioritized set of network performance improvement solutions based on the values of the set of prioritization parameters. The optimum solution selection and ranking module 240 can then select and/or implement, at the identified site location, an optimum network performance improvement solution from the prioritized set of network performance improvement solutions based on the computed rank values.

Flow Diagrams

Figure 5:
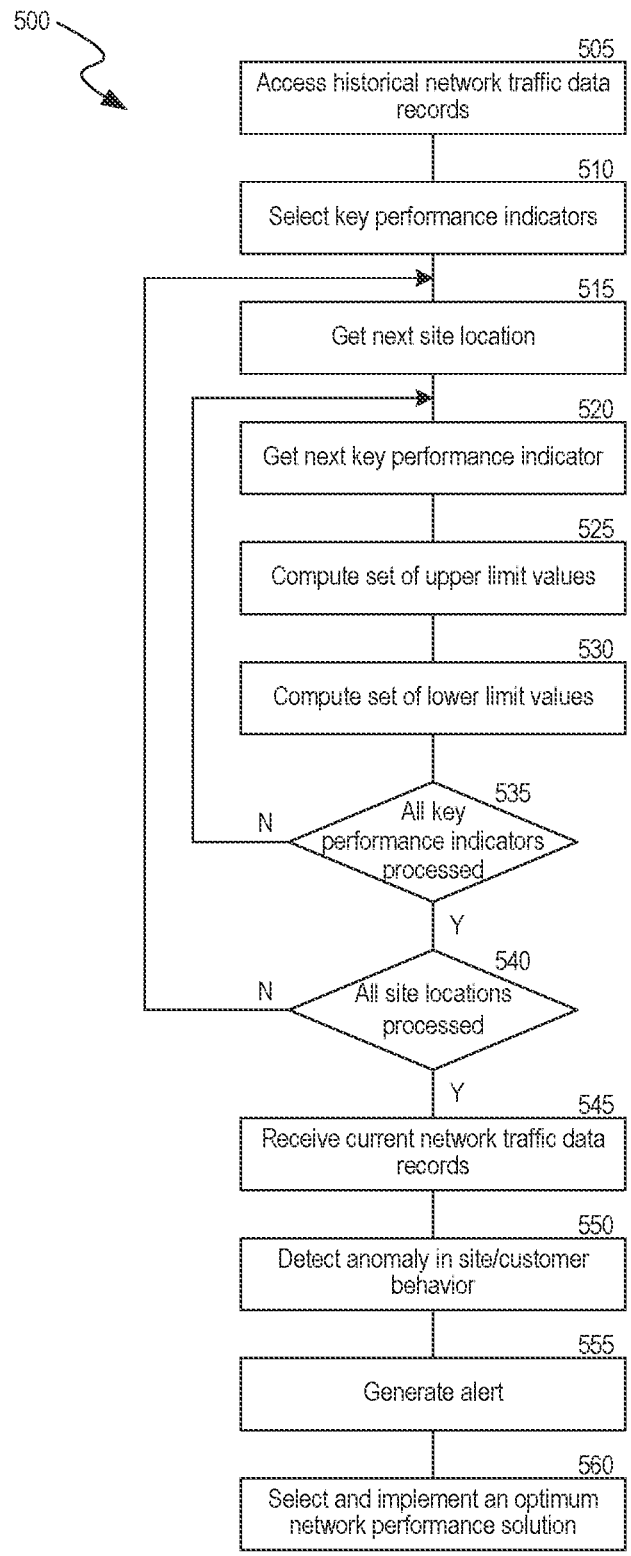
FIG. 5 is a flow diagram illustrating a process of anomaly detection to understand abnormal behavior of cell sites in a telecommunications network.

FIG. 5 is a flow diagram illustrating a process 500 of detecting anomalies in site and/or customer behavior and identifying optimum network performance improvement solution capable of deployment at site locations to fix the detected anomalies. Process 500 begins at block 505 where it accesses a set of historical network traffic data records for multiple locations. Each record in the set of historical network traffic data records comprises information about a location and values of performance indicators. At block 510, process 500 selects a subset of key performance indicators from a set of key performance indicators based on, for example, a correlation of each key performance indicator with customer experience. At blocks 515-540, for a set of site locations and for each selected KPI, process 500: computes a set of upper limit values (block 525) and/or a set of lower limit values (block 530). At block 545, process 500 receives a location and/or current (e.g., near real-time) network traffic data records for the location. For the received location, at block 550, process 500 detects anomalies in site behavior, customer behavior, or both. When an anomaly is detected, based on one or more alert rules, at block 555 process 500 generates reports and/or alerts for the detected anomalies. Further, at block 560, process 500 selects and/or implements, at the received location, an optimum network performance improvement solution selected from, for example, a prioritized set of network performance improvement solutions.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects can likewise be implemented in a computer-readable medium. Accordingly, the inventors reserve the right to add additional claims after filing the application to pursue such additional claim forms for other aspects of the technology.

The invention claimed is:

1. A computer-implemented method for managing abnormal behavior of cell sites in a telecommunications network, the method comprising:
   selecting a subset of key performance indicators from a set of key performance indicators based on a correlation of each key performance indicator with customer experience when customers use the telecommunications network;
   accessing historical network traffic data records comprising information about cell site locations and historical values of key performance indicators in the subset of key performance indicators;
   for at least some cell site locations among the cell site locations:
      for each key performance indicator in the subset of key performance indicators:
         computing a set of upper limit values of the key performance indicator;
         computing a set of lower limit values of the key performance indicator;
   receiving current network traffic data records comprising information about the cell site locations and current values of the key performance indicators in the subset of key performance indicators;
   detecting anomalies in the current network traffic data records for a cell site location based on the computed set of upper limit values and the computed set of lower limit values; and
   when at least one anomaly is detected for at least a threshold period of time, generating at least one alert indicating abnormal behavior at the cell site location.

2. The computer-implemented method of claim 1 wherein the set of key performance indicators comprises:
   traffic,
   number of users,
   Physical Resource Block (PRB) utilization,
   Channel Quality Indicator (CQI),
   wireless data throughput,
   carrier aggregation,
   advanced Quadrature Amplitude Modulation (QAM) value, or
   any combination thereof.

3. The computer-implemented method of claim 1, wherein detecting anomalies in the current network traffic data records for the cell site location further comprise:
   comparing, at a predetermined time interval, values of at least some key performance indicators in the subset of key performance indicators with the computed set of upper limit values and the computed set of lower limit values.

4. The computer-implemented method of claim 1 wherein the historical network traffic data records comprise historical values of key performance indicators collected over a predetermined period of time and at predetermined frequency intervals.

5. The computer-implemented method of claim 1, further comprising:
   automatically identifying an optimum network performance improvement solution to be implemented at the cell site location in response to the generated at least one alert, and
   wherein the network performance improvement solutions comprises:
   adding spectrum,
   removing spectrum,
   adding a proximate cell site,
   removing a proximate cell site,
   displacing a proximate cell site,
   adding or enhancing at least one technology capability,
   cell split,
   small cell deployment,
   sector addition,
   sector removal,
   sector capacity enhancement,
   cell on wheels addition,
   cell on wheel removal,
   tower addition,
   tower removal,
   hot spots addition,
   hot spots removal,
   capacity modification,
   or any combination thereof.

6. The computer-implemented method of claim 1, further comprising:
   automatically identifying an optimum network performance improvement solution to be implemented at the cell site location in response to the generated at least one alert.

7. At least one non-transitory computer-readable medium carrying instructions, which when executed by at least one data processing platform, manage cell site behavior in a telecommunications network, the instructions comprising:

selecting a subset of key performance indicators from a set of key performance indicators based on a correlation of each key performance indicator with customer experience;

accessing historical network traffic data records comprising information about cell site locations and historical values of key performance indicators in the subset of key performance indicators;

receiving current network traffic data records comprising information about the cell site locations and current values of the key performance indicators in the subset of key performance indicators;

detecting anomalies in the current network traffic data records for a cell site location based on upper limit and lower limit values for the key performance indicators in the subset of key performance indicators; and when at least one anomaly is detected for at least a period of time, generating at least one alert indicating abnormal behavior at the cell site location.

8. The computer-readable medium of claim 7 wherein the set of key performance indicators comprises:
traffic,
number of users,
Physical Resource Block (PRB) utilization,
Channel Quality Indicator (CQI),
throughput,
carrier aggregation,
advanced Quadrature Amplitude Modulation (QAM), or any combination thereof.

9. The computer-readable medium of claim 7, wherein detecting anomalies in the current network traffic data records for the cell site location further comprise:
comparing, at a predetermined time interval, values of at least one key performance indicator in the subset of key performance indicators with the computed set of upper limit values and the computed set of lower limit values.

10. The computer-readable medium of claim 7 wherein the historical network traffic data records comprise historical values of key performance indicators collected over a predetermined period of time and at predetermined frequency intervals.

11. The computer-readable medium of claim 7, further comprising:
automatically identifying a network performance improvement solution to be implemented at the cell site location in response to the generated at least one alert.

12. The computer-readable medium of claim 11, wherein the network performance improvement solutions comprises:
adding spectrum,
removing spectrum,
adding a proximate cell site,
removing a proximate cell site,
displacing a proximate cell site,
adding or enhancing at least one technology capability,
cell split,
small cell deployment,
sector addition,
sector removal,
sector capacity enhancement,
cell on wheels addition,
cell on wheel removal,
tower addition,
tower removal,
hot spots addition,
hot spots removal,
capacity modification,
or any combination thereof.

13. The computer-readable medium of claim 7, further comprising:
for at least some cell site locations among the cell site locations:
for each key performance indicator in the subset of key performance indicators:
computing a set of upper limit values of the key performance indicator;
computing a set of lower limit values of the key performance indicator.

14. An apparatus configure to manage cell site behavior in a telecommunications network, the apparatus comprising:
at least one data processor; and
at least one memory, coupled to the at least one data processor and storing instructions, where the instructions, when executed by the at least one data processor, performs the following operations, comprising:
selecting a subset of key performance indicators from a set of key performance indicators based on a correlation of each key performance indicator with customer experience;
accessing historical network traffic data records that include information about cell site locations and historical values of key performance indicators in the subset of key performance indicators;
receiving current network traffic data records that include information about the cell site locations and current values of the key performance indicators in the subset of key performance indicators;
detecting anomalies in the current network traffic data records for a cell site location based on upper limit and lower limit values for the key performance indicators in the subset of key performance indicators; and,
when at least one anomaly is detected for at least a period of time, generating at least one alert indicating abnormal behavior at the cell site location.

15. The apparatus of claim 14 wherein the set of key performance indicators comprises:
traffic,
number of users,
Physical Resource Block (PRB) utilization,
Channel Quality Indicator (CQI),
throughput,
carrier aggregation value,
advanced Quadrature Amplitude Modulation (QAM), or any combination thereof.

16. The apparatus of claim 14, wherein detecting anomalies in the current network traffic data records for the cell site location further comprises:
comparing, at a predetermined time interval, values of at least one key performance indicator in the subset of key performance indicators with the computed set of upper limit values and the computed set of lower limit values.

17. The apparatus of claim 14 wherein the historical network traffic data records comprise historical values of key performance indicators collected over a predetermined period of time and at predetermined frequency intervals.

18. The apparatus of claim 14, further comprising:
automatically identifying a network performance improvement solution to be implemented at the cell site location in response to the generated at least one alert.

19. The apparatus of claim 18, wherein the network performance improvement solutions comprises:
adding spectrum, removing spectrum,
adding a proximate cell site,
removing a proximate cell site,
displacing a proximate cell site,
adding or enhancing at least one technology capability,
cell split,
small cell deployment,
sector addition,
sector removal,
sector capacity enhancement,
cell on wheels addition,
cell on wheel removal,
tower addition,
tower removal,
hot spots addition,
hot spots removal,
capacity modification,
or any combination thereof.

20. The apparatus of claim 14, further comprising:
for at least some cell site locations among the cell site locations:
  for each key performance indicator in the subset of key performance indicators:
    computing a set of upper limit values of the key performance indicator;
    computing a set of lower limit values of the key performance indicator.

\* \* \* \* \*